United States Patent [19]
Carbonnel et al.

[11] 3,829,243
[45] Aug. 13, 1974

[54] POROUS CONDUCTIVE CERAMIC ELECTRODES FOR CORROSIVE LIQUID METAL CONDUCTION PUMP

[75] Inventors: Henri Carbonnel, Antony; Robert Borie, Sceaux, both of France

[73] Assignee: Groupement Atomique Alsacienne Atlantique, Le Plessis-Robinson, France

[22] Filed: Dec. 21, 1972

[21] Appl. No.: 317,495

[30] Foreign Application Priority Data
Dec. 22, 1971  France .............................. 71.46210

[52] U.S. Cl. ................................. 417/50, 29/155.5
[51] Int. Cl. ..................... H02k 45/00, B23p 17/00
[58] Field of Search ............................... 417/48, 50

[56] References Cited
UNITED STATES PATENTS
2,539,215  1/1957  Weil ...................................... 417/50
2,652,778  9/1953  Crever ................................... 417/50
2,838,001  5/1957  Robinson ............................. 417/50
3,088,411  5/1963  Schmidt ................................ 417/50

*Primary Examiner*—William L. Freeh
*Assistant Examiner*—Arnold F. Ward
*Attorney, Agent, or Firm*—Sughrue, Rothwell, Mion, Zinn & Macpeak

[57] ABSTRACT

Improvement to conduction pumps for corrosive liquid metals in which the conductive coil in its entirety or only the electrodes of that coil placed in contact with the corrosive liquid metal flux are constituted by a porous conductive ceramic substance impregnated after annealing of the said liquid metal. Impregnating is obtained by immersion in a hot bath of that liquid metal above which is arranged a metallo-alkaline fluoride bath.

9 Claims, 1 Drawing Figure

PATENTED AUG 13 1974  3,829,243
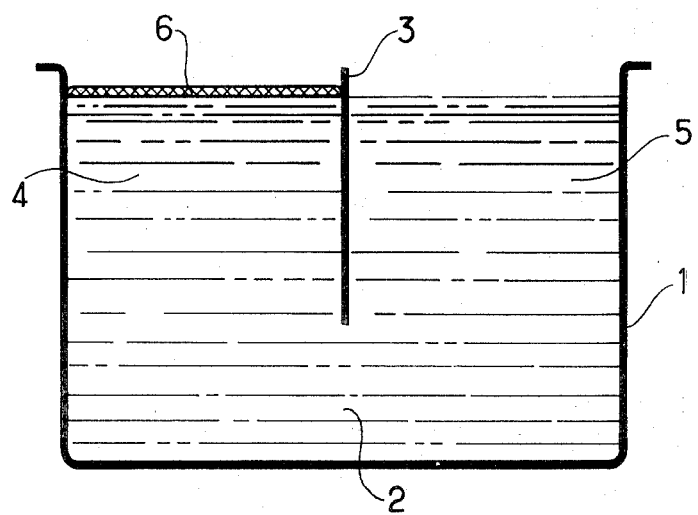

POROUS CONDUCTIVE CERAMIC ELECTRODES FOR CORROSIVE LIQUID METAL CONDUCTION PUMP

The present application concerns an improvement to conduction pumps suitable for being immersed in liquid metal and intended for conveying corrosive metals such as aluminium, zinc, cast iron, or steel in the liquid state.

The use of pumps for liquid metals has been developed contemporaneously with the development of various techniques requiring the conveying of liquid metals, such as in foundry operations and the purifying of metals.

Thus, in conduction pumps, the current is made to pass through a transverse section of the duct and of the liquid metal flux it contains, within a magnetic field perpendicular to the direction of the electric current and to the direction of the liquid metal flux, so that a force directed along the third axis of a trihedron whose first two axes are pointed respectively in the direction of the field and in the direction of the current is generated within the liquid metal.

For active metals such as aluminium, zinc, cast iron, or steel, circumstances have led to the forming of the liquid metal duct with refractory materials; however, these materials are generally fairly poor conductors of electricity. The electrical resistance of the walls of the ceramic duct then interferes with the penetration of current into a transverse section of the liquid metal flux. This state of affairs had prevented, for a long time, the practical employment of conduction pumps for corrosive liquid metals.

This difficulty has been overcome by replacing two opposite sides of the liquid metal duct by electrodes located at an appropriate point in the duct, thereby enabling passing of the electric current through the duct and the liquid metal at that point, while, the sides opposite to the electrodes continue to be constituted by the refractory material forming the remainder of the duct. Such electrodes must withstand very corrosive metals, provide good conductivity for the flow of current, and ensure fluid-tight sealing of the duct. Lastly, it is known that the conductive coil itself may be constituted by any conductive body such as a conventional metallic conductor made of copper or nickel, for example, or a duct constituted by the conveyed corrosive metal; but in all cases, in the vicinity of the vertical conduit for liquid metal, the conductive coil is ended by electrodes which must have the complex qualities set forth above. Thus, the electrode must be constituted by a material having a heat expansion coefficient as near as possible to that of the refractory material used for forming the vertical conduit so as not to allow any gap to appear by expansion between the two materials. Moreover, that electrode must be electrically connected to the conductive coil; and, furthermore, it must be suitable for wetting by the corrosive liquid metal. Lastly, it must obviously withstand the chemical action of the hot corrosive liquid metal without undergoing any damage.

It is known that such devices have, with respect to the prior art, numerous advantages, particularly residing in the fact that it is possible to immerse such pumps in the liquid metal so that it is possible to bring them into action without outside priming; moreover, the cross-section of the pump body is less voluminous than in other rival pumps (more particularly induction pumps) since the windings may be installed, in the present case, far from the pump body and outside the liquid metal. In the case of pumping by immersion a metal contained in a crucible or in a ladle, the volume occupied by the pump is therefore very much reduced and there is accordingly a smaller loss in capacity of the useful volume of the crucible or of the ladle. Lastly, the windings are arranged above the bath and are easier to protect against any sudden rise in temperature.

Methods enabling corrosion proof electrodes and facilitating the flow of current and having a coefficient of expansion very close to that of the refractory materials limiting at least one of the sides of the liquid metal flux conduit to be produced are now known.

Lastly, in the case where the coil in which the electric current passing through the electrodes and through the liquid metal flux is constituted by a duct for the corrosive liquid metal to be conveyed, it is known that these electrodes must be made of a porous refractory material impregnated with the corrosive liquid metal to be conveyed.

These requirements have led the applicants' assignee to study very closely the means enabling certain elements constituting the conductive coil to be produced with a porous ceramic substance which is, at the same time, conductive even though it has been subjected to a previous treatment designed to improve its mechanical properties.

The object of the present invention is therefore an improvement to conduction pumps for corrosive liquid metals comprising a conductive coil in which an electric current crossing a section of the liquid metal flux is induced. According to this improvement, in a direction perpendicular to the said flux, the conductive coil comprises, in general, two electrodes connected electrically by a portion of conductive loop characterised in that at least a portion of the said coil is made of a porous ceramic substance which is, at the same time, conductive, annealed, and impregnated with corrosive liquid metal.

In certain embodiments, the applicants have formed a conductive coil comprising electrodes made of porous ceramic material which is at the same time conductive and impregnated with the corrosive liquid metal to be conveyed, whereas the rest of the coil is constituted by a duct for the corrosive liquid metal to be conveyed by the pump.

The performances thus obtained are particularly noteworthy; the liquid metal sometimes perfectly wets each electrode both on its face in contact with the liquid metal flux being pumped and on the face in contact with the liquid metal duct closing the loop. The coefficient of expansion of the electrodes made of conductive ceramic material being very close to that of the refractory materials limiting the other sides of the duct for the liquid metal flux, fluid-tight sealing is easy to ensure.

In other embodiments, the Applicants have formed the coil (electrodes and loop included) with a porous impregnated conductive ceramic material. Ohmic losses due to the interface between the electrodes and the conductive loop are thus cancelled, the construction of the pump is simplified, and perfect fluid-tight sealing may be ensured at the level of the active portion of the coil.

These improvements have been made possible by a treatment which improves the conductivity of the conductive ceramic materials, while at the same time improving their mechanical properties.

For such a ceramic material constituted by conductive grains of titanium diboride, for example, to be able to have high porosity after molding, it is necessary for the ceramic material not to be subjected to any compression at the time of sintering. This results in the mechanical connection between the grains not necessarily having all the otherwise available strength. However, subsequent annealing in a neutral atmosphere then enables the cohesion of the conductive grains to be increased to a large degree. Conversely, for given mechanical properties, it will be possible to obtain a greater porosity as soon as it is known that the ceramic material will be annealed. In this way, a better aptitude of the conductive coil to be wetted and, consequently, a reduction in its electrical resistance are obtained by performing, on the coil or the electrodes, a complementary treatment after casting which it has been relatively easy to effect on an industrial scale.

After it has been removed from the mold, the coil is subjected to annealing in a neutral atmosphere at a temperature on the order of 1,600°C followed by dipping in a liquid metal bath kept at a temperature on the order of 50°C to 250°C higher than its melting point and having a bath of metallo-alkaline fluorides located above it.

Nevertheless, in certain cases, where the quality essentially required is a better wetting with the liquid metal to be conveyed, as well as a better protection against oxydation, the dipping step may be sufficient by itself. It should be observed that, when the liquid metal to be conveyed is iron, the dipping step entails, at the same time, annealing.

The impregnation of the electrodes or of the complete conductive coil with the liquid metal, particularly after annealing, may be produced according to a technique giving very satisfactory results described below by way of illustration with reference to the single figure showing a diagram of the impregnation operation.

A tank containing the corrosive liquid metal 2 kept at a temperature of 50°C to 250°C higher than its melting point (which is 850°C for aluminium) is shown at 1. The metal tank is divided into two compartments 4 and 5 down to half its depth by a wall 3. In the compartment 4, the liquid metal has a layer having a certain thickness of metallo-alkaline fluorides 6 installed above it. The dipping operation consists in first dipping the electrode to be treated in the portion 4 of the tank, then removing it and dipping it in the compartment 5.

The metallo-alkaline fluorides which float at the surface of the liquid metal wet the electrode as the latter is passed through the former, thereby enabling better adherence of the liquid metal on the porous metal edge of the conductive ceramic material forming the electrode. The result is both a great improvement in the wetting by the liquid metal when the pump is brought into action and, at the same time, a great improvement in the protection of the ceramic material against oxydation.

The parts annealed by the technique set forth above are particularly suitable for implementing the invention.

Although the technique described above appears to afford the greatest advantages, it will nevertheless be understood that various modifications may be made thereto without going beyond the scope of the invention. In particular, the technique may be modified as required to produce either a pump comprising a conductive coil made entirely of a porous impregnated conductive ceramic substance or comprising a coil whose two ends only are made of a porous impregnated conductive material, whereas the rest of the loop is constituted by a duct for liquid metal.

We claim:

1. In a conduction pump for pumping corrosive liquid metals including a conductive coil, whose induced electric current crosses a section of the liquid metal flux in a direction perpendicular to said flux and in which said coil comprises in general, two electrodes connected electrically by a conductive loop portion, the improvement wherein; at least a portion of said coil is formed of a porous annealed conductive ceramic substance impregnated with said corrosive liquid metal.

2. The conduction pump as claimed in claim 1, wherein two electrodes limiting the section of the liquid metal flux are formed of a porous conductive material ceramic substance which is annealed and impregnated with the said corrosive liquid metal.

3. The conduction pump as claimed in claim 1, wherein the entirety of the coil on the two sides opposite to the section of the liquid metal flux is constituted by a porous ceramic substance of conductive material which is annealed and impregnated with said liquid corrosive metal.

4. In a method of forming an improved conductive coil for a conduction pump pumping corrosive liquid metal by electric current induction which crosses a section of the liquid metal flux in a direction perpendicular to the flux and wherein said coil comprises in general two electrodes connected by a conductive loop and wherein at least a portion of the coil is made of a porous annealed conductive ceramic substance impregnated with said corrosive liquid metal, the improvement wherein the porous conductive ceramic material is annealed in a neutral atmosphere.

5. The method as claimed in claim 4, further comprising the step of dipping the conductive ceramic material in a bath of corrosive liquid material maintained at a temperature greater by 50° C. to 250° C. than its melting point while maintaining a layer of metallo-alkaline fluoride above said liquid corrosive metal.

6. The method claimed in claim 4 wherein the annealing is effected at a temperature on the order of 1,600°C.

7. In a conductive coil for use in a conductive pump adapted to pump corrosive liquid metals, which conductive coil:
   1 comprises two electrodes connected electrically by a conductive coil and
   2 is at least partly formed of a porous conductive ceramic substance impregnated with a corrosive liquid metal, the improvement wherein the portion of said coil formed of said porous conductive ceramic substance is annealed.

8. A conductive coil as claimed in claim 6 wherein said electrodes are formed of said porous conductive ceramic substance.

9. A conductive coil as claimed in claim 6 wherein the entirety of said coil is formed of said porous conductive ceramic substance.

* * * * *